April 10, 1962 J. SCACCIA, JR 3,028,611
BAIT TANK FOR BOATS
Filed May 11, 1959
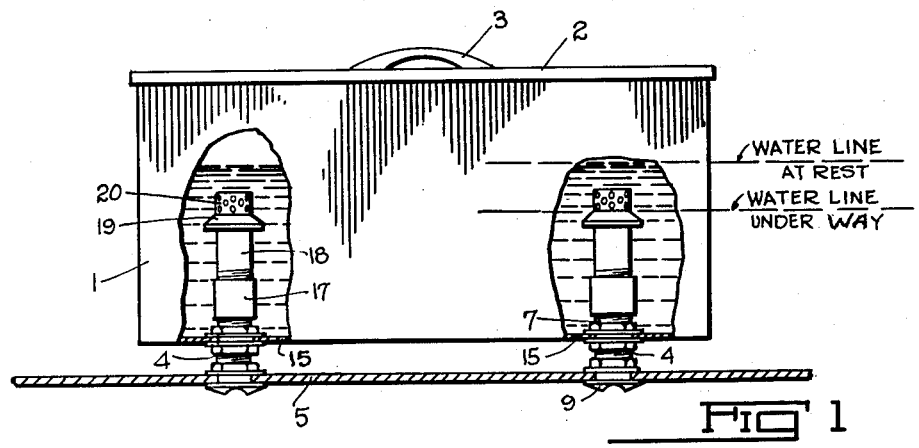
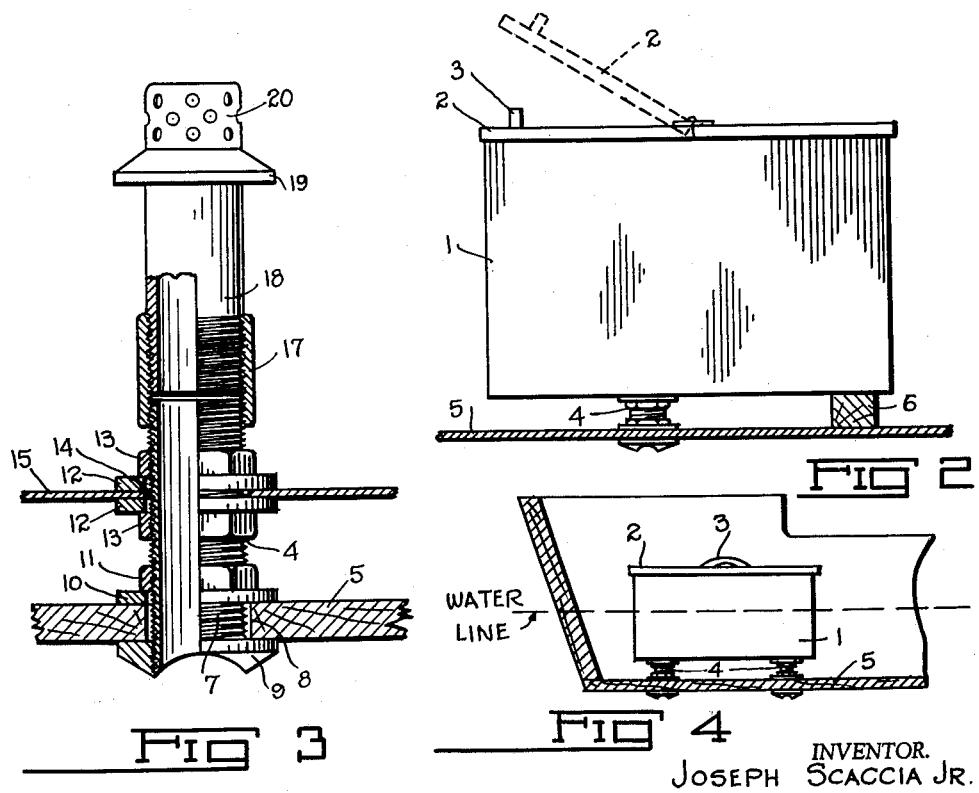
INVENTOR.
JOSEPH SCACCIA JR.
BY
Charles Richard Werner
ATTORNEY

United States Patent Office 3,028,611
Patented Apr. 10, 1962

3,028,611
BAIT TANK FOR BOATS
Joseph Scaccia, Jr., Bellwood, Ill. (Walker, Minn.)
Filed May 11, 1959, Ser. No. 812,412
10 Claims. (Cl. 9—1)

My invention relates in general to bait tanks for boats and in particular to a bait tank mounted within a boat and having conduit connections with the water on which the boat is resting whereby the tank will maintain a definite level of water in which live bait can be kept.

While the general idea of building bait tanks in boats is known to the art, my invention contemplates the improvement in such tanks whereby liquid level is controlled and there is no danger of losing live minnows through the water supply conduit.

The primary object of my invention is, therefore, to provide a bait tank for boats comprising a bait receptacle, conduits supporting the receptacle in the boat and extending from the external bottom of the boat up into the receptacle above the bottom of said receptacle whereby suction created by forward movement of the boat will not drain all the water from the interior of the receptacle.

Another object of my invention is to provide a bait tank with internal conduits extending upwardly into the tank from the bottom of the boat, the top of the conduit being normally above the water level when the boat is under way, the water rising to the normal water level when the boat is stopped.

One more object is to provide screens for the upper end of the conduits to prevent loss of live bait therethrough.

And still one more object of my invention is to provide an adjustable conduit whereby the top level thereof can be changed to suit the particular draft of the boat in which the bait tank is mounted.

Other objects and advantages as well as the construction and manner of use of the bait tank comprising my invention will be apparent by reference to the following specification in connection with the accompanying drawing in which:

FIG. 1 is a front elevational view of my bait tank installed in a boat, with parts being broken away in section for clarity of illustration.

FIG. 2 is a side elevational view of the same.

FIG. 3 is an enlarged detailed view of the conduit with parts being shown in section and fragmentary parts of the boat and tank being shown.

FIG. 4 is a reduced front elevational view of the tank installed in a boat with a fragmentary portion of the boat being shown.

Referring now to the drawing by numerals of reference, 1 designates a suitable tank of convenient dimensions having hinged lid 2 and handle 3.

Several tank supporting conduits 4 raise the tank or receptacle from the bottom 5 of the boat, and suitable blocking members 6 may be used at the rear of the receptacle since the conduits 4 are preferably positioned toward the front of said receptacle.

The supporting conduits 4 include a lower threaded conduit member 7 extending through opening 8 in the bottom of the boat, the conduit member 7 being provided with flanged intake end 9 in contact with the bottom 5 of the boat. A sealing washer 10 and nut 11 hold the lower conduit member 7 securely in place in the bottom of the boat and in water-tight relation therewith.

Spaced from the bottom of the boat are a pair of sealing washers 12 and nuts 13, the lower conduit passing through opening 14 in the bottom 15 of the receptacle 1, said washers 12 and nuts 13 retaining the tank in elevated position relative to the bottom 5 of the boat. A blocking member 6 will aid in steadying the tank within the boat.

A suitable sealing compound may be used in conjunction with the flanged intake 9 and sealing washers 10 and 12 to aid in attaining a water tight connection.

The upper end of the lower conduit is threadedly secured to a coupling member 17 which in turn is threadedly engaged to an upper conduit member 18, the upper end of which has flange or skirt 19 and a plurality of apertures forming a screen 20 to prevent passage of live bait in the form of minnows or the like down through the conduit. The skirt 19 tends to prevent excessive water agitation at the inlets to the conduits and also, when the boat comes to a stop and water enters through the screen 20, the water is distributed laterally by the flanges 19.

When the bait tank or receptacle is placed in use, with the boat at rest in the water, water will enter the conduits and fill the tank to the same level as the water externally of the boat. When the boat is under way, suction tends to draw water out of the tank. However, it can only draw out the water above the top of the conduits and there will always be water in the tank below the level of the screens 20. Whenever the boat comes to a halt, fresh water will flow up through the conduits and mix with the water already in the tank. In this manner, fresh water is always being added to the tank, which is another feature of my invention. Live minnows cannot escape because of the screens 20 which will not become clogged since water is alternately going in both directions therethrough.

By providing the adjustable upper conduit 18 my tank may be used on any boat regardless of the draft or water line since the tank level and water level can be adjusted to suit any condition. It has been found preferable to allow about one inch of water above the top of the screen 20 when the boat is at rest in the water. Ajustments of the upper conduit 18 may be made after installation and while the boat is in the water so that best water flow results are obtained. Such adjustments sometimes must be made at various times during use depending on the loading and change of loading of the boat.

With a covered tank or receptacle, sloshing of water while under way or in bad weather will not be detrimental as the water will not spill out of the tank. Live bait will be maintained in fresh water at all tides. Draining of the tank may be accomplished by removing one of the conduits while the boat is under way or when removed from the water, or any suitable siphon or pump means may be employed.

From the foregoing it will be apparent that I have provided a new and novel bait tank which is relatively simple in construction and easy to install. It is adaptable to all boats and adjustable to function properly according to the draft of the boat in which installed. It will retain water in the tank at all times whether the boat is under way or at rest, and live bait such as minnows will be prevented from discharging through the conduit, while fresh water is added to the tank each time the boat comes to a stop. Suction created by movement of the boat will not cause removal of all the water from the tank since the inlet end of the conduit is positioned well above the bottom of the tank but below the normal water line of the boat. Suction will draw out only the water above the inlet of the conduit and this water will be replenished as soon as the boat stops, or slows down in the water.

Obviously, changes in form, proportion and minor details of construction may be resorted to without departing from the spirit of my invention and I reserve all rights

What I claim as new and desire to secure by Letters Patent is:

1. A bait tank in combination with a boat, comprising a receptacle, a mounting means securing the receptacle in vertically spaced relation above the bottom of said boat, said mounting means including conduit means permitting flow of water into and out of the receptacle, the top of said conduit means terminating within the receptacle above the inner surface of the bottom thereof, whereby water in the tank below the level of the top of the conduit means will remain in the tank and cannot be suctioned from the tank by movement of the boat through the water.

2. The structure as specified in claim 1, and water-tight connections between the mounting means and the receptacle and between the mounting means and the bottom of the boat.

3. The structure as specified in claim 1, and a screened opening at the top of said conduit means and within the receptacle.

4. The structure as specified in claim 3, said screened opening and conduit means being so related vertically above the bottom of the tank as to be below the water line when the boat is at rest and above the water line when the boat is under way.

5. The structure as specified in claim 1, and a flanged collar on said conduit means adjacent and below the top of said conduit means and below the level of the water in the receptacle.

6. A bait tank in combination with a boat, comprising a receptacle, a mounting means securing the receptacle in vertically spaced relation above the bottom of said boat, said mounting means being provided with a fluid passageway connecting with the water, a conduit member extending upwardly from the mounting means and connecting with the fluid passageway in said mounting means, the upper end of the conduit member being below the surface of the normal water level in the tank when the boat is not under way and above the surface of the water level when the boat is under way.

7. A bait tank in combination with a boat, comprising a receptacle, conduit means supporting the receptacle in vertically spaced relation above the bottom of the boat and forming a water passage to the receptacle, a conduit means extension rising into the receptacle to a point where the top of the conduit means extension is below the normal water level in the receptacle when the boat is not under way in the water and above the water level when the boat is under way.

8. The structure as specified in claim 7, said conduit means extension being adjustably related to the conduit means.

9. A bait tank in combination with a boat, comprising a receptacle, vertically extensible conduit means extending from the bottom of the boat through the bottom of the receptacle and to a point in the receptacle where the top of the conduit means is below the normal level of the water when the boat is not under way and above the water level when the boat is under way, and watertight connections between the conduit means and the bottom of the boat and the bottom of the receptacle.

10. A bait tank in combination with a boat, comprising a receptacle, a mounting means supporting the receptacle in spaced vertical relation to the bottom of the boat, a watertight connection between the mounting means and the bottom of the boat, a watertight connection between the mounting means and the bottom of the receptacle, a passageway for water through the mounting means, an extension rising from the mounting means and a coupling member between the mounting means and the extension, the top of said extension extending upwardly to a point below the normal water level when the boat is not under way and above the water level when the boat is under way.

References Cited in the file of this patent

UNITED STATES PATENTS

| | | |
|---|---|---|
| 46,801 | Irers | Mar. 14, 1865 |
| 906,261 | Morzinski | Dec. 8, 1908 |
| 1,649,683 | Goodsman | Nov. 15, 1927 |
| 1,939,583 | Welshausen | Dec. 12, 1933 |
| 1,956,524 | Byram | Apr. 24, 1934 |
| 2,473,874 | Ganong | June 21, 1949 |